(12) United States Patent
Mozak

(10) Patent No.: US 7,945,050 B2
(45) Date of Patent: May 17, 2011

(54) SUPPRESSING POWER SUPPLY NOISE USING DATA SCRAMBLING IN DOUBLE DATA RATE MEMORY SYSTEMS

(75) Inventor: Christopher P. Mozak, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 11/864,141

(22) Filed: Sep. 28, 2007

(65) Prior Publication Data
US 2009/0086972 A1 Apr. 2, 2009

(51) Int. Cl.
*H04L 9/00* (2006.01)
*G06F 12/14* (2006.01)
*H04N 7/16* (2011.01)
(52) U.S. Cl. .................. 380/268; 713/193; 726/26
(58) Field of Classification Search .............. 380/268; 713/193; 726/26
See application file for complete search history.

(56) References Cited

U.S. PATENT DOCUMENTS

| | | | |
|---|---|---|---|
| 7,793,195 B1 * | 9/2010 | Wu | 714/781 |
| 7,843,926 B1 * | 11/2010 | Muller et al. | 370/392 |
| 2002/0120897 A1 * | 8/2002 | Eby | 714/738 |
| 2003/0048903 A1 * | 3/2003 | Ito et al. | 380/263 |
| 2004/0111663 A1 * | 6/2004 | Lewis | 714/776 |
| 2006/0041800 A1 | 2/2006 | Johnson | |
| 2006/0085710 A1 * | 4/2006 | Spica et al. | 714/728 |
| 2006/0281425 A1 * | 12/2006 | Jungerman | 455/183.2 |
| 2007/0290902 A1 | 12/2007 | Bae et al. | |

FOREIGN PATENT DOCUMENTS

EP 1069497 2/2005

OTHER PUBLICATIONS

GB PTO, "First Office Action", UK Application No. 0817778.4, Mailed Jan. 30, 2009, whole document.
First Office Action mailed Feb. 12, 2011 for Chinese Patent Application No. 200810188780.1.

* cited by examiner

*Primary Examiner* — Michael Pyzocha
(74) *Attorney, Agent, or Firm* — Blakely, Sokoloff, Taylor & Zafman LLP

(57) ABSTRACT

Embodiments of the invention are generally directed to systems, methods, and apparatuses for suppressing power supply noise using data scrambling in double data rate memory systems. In some embodiments, an integrated circuit includes a transmit data path to transmit data to one or more memory devices. The transmit data path may include scrambling logic to generate, in parallel, N pseudo random outputs that are uncorrelated with each other. The output data and the pseudo random outputs are input to XOR logic. The transmit data path transmits the output the of XOR logic which has a substantially white frequency spectrum. Other embodiments are described and claimed.

21 Claims, 5 Drawing Sheets

Polynomial: $X^{16} + X^{13} + X^{10} + X^9 + X^8 + X^4 + 1$

| INPUTs | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 1 | 0 | 1 | 0 | 0 | 1 | 0 | 0 | 0 | 1 | 0 | 0 | 0 | 0 | 0 | 0 |
| 1 | 0 | 1 | 0 | 1 | 0 | 0 | 1 | 0 | 0 | 0 | 1 | 0 | 0 | 0 | 0 | 0 |
| 2 | 0 | 0 | 1 | 0 | 1 | 0 | 0 | 1 | 0 | 0 | 0 | 1 | 0 | 0 | 0 | 0 |
| 3 | 0 | 0 | 0 | 1 | 0 | 1 | 0 | 0 | 1 | 0 | 0 | 0 | 1 | 0 | 0 | 0 |
| 4 | 1 | 0 | 0 | 0 | 1 | 0 | 1 | 0 | 0 | 1 | 0 | 0 | 0 | 1 | 0 | 0 |
| 5 | 0 | 1 | 0 | 0 | 0 | 1 | 0 | 1 | 0 | 0 | 1 | 0 | 0 | 0 | 1 | 0 |
| 6 | 0 | 0 | 1 | 0 | 0 | 0 | 1 | 0 | 1 | 0 | 0 | 1 | 0 | 0 | 0 | 1 |
| 7 | 0 | 0 | 0 | 1 | 0 | 0 | 0 | 1 | 0 | 1 | 0 | 0 | 1 | 0 | 0 | 0 |
| 8 | 1 | 0 | 0 | 0 | 0 | 0 | 0 | 0 | 1 | 0 | 1 | 0 | 0 | 1 | 0 | 0 |
| 9 | 1 | 0 | 0 | 0 | 0 | 0 | 0 | 0 | 0 | 1 | 0 | 1 | 0 | 0 | 1 | 0 |
| A | 1 | 1 | 0 | 0 | 0 | 1 | 0 | 0 | 0 | 0 | 1 | 0 | 1 | 0 | 0 | 1 |
| B | 0 | 1 | 1 | 0 | 0 | 0 | 1 | 0 | 0 | 0 | 0 | 1 | 0 | 1 | 0 | 0 |
| C | 1 | 0 | 1 | 1 | 0 | 0 | 0 | 1 | 0 | 0 | 0 | 0 | 1 | 0 | 1 | 0 |
| D | 1 | 1 | 0 | 1 | 1 | 0 | 0 | 0 | 1 | 0 | 0 | 0 | 0 | 1 | 0 | 1 |
| E | 0 | 1 | 1 | 0 | 1 | 1 | 0 | 0 | 0 | 1 | 0 | 0 | 0 | 0 | 1 | 0 |
| F | 0 | 0 | 1 | 1 | 0 | 1 | 1 | 0 | 0 | 0 | 1 | 0 | 0 | 0 | 0 | 1 |

OUTPUTs

EX: Logic for calculating LFSR Output in cycle N+1 based on cycle N $Out_{N+1}[2] = Out_N[2] + Out_N[5] + Out_N[8] + Out_N[9] + Out_N[A] + Out_N[E]$

SUPPRESSING POWER SUPPLY NOISE USING DATA SCRAMBLING IN DOUBLE DATA RATE MEMORY SYSTEMS

TECHNICAL FIELD

Embodiments of the invention generally relate to the field of integrated circuits and, more particularly, to systems, methods and apparatuses for suppressing power supply noise using data scrambling in double data rate memory systems.

BACKGROUND

Memory systems are frequently defined by specifications such as the DDR (double data rate) Specification. The "DDR Specification" refers to any of the specifications that define DDR technology including, for example, The DDR2 Specification published by the Joint Electron Device Engineering Council (JEDEC). The DDR Specification calls for very tight jitter and timing specifications. Meeting these jitter and timing specifications is becoming more difficult because the IO (input/output) frequencies of DDR memory systems is increasing. The majority of the jitter and timing error is due to power supply noise.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 is a conceptual diagram illustrating selected aspects of a scrambling process based on a linear feedback shift register implemented according to an embodiment of the invention.

DETAILED DESCRIPTION

Embodiments of the invention are generally directed to systems, methods, and apparatuses for suppressing power supply noise using data scrambling in double data rate memory systems. In some embodiments, an integrated circuit includes a transmit data path to transmit data to one or more memory devices. The transmit data path may include scrambling logic to generate, in parallel, N pseudo random outputs that are uncorrelated with each other. The output data and the pseudo random outputs are input to XOR logic. The transmit data path transmits the output the of XOR logic which has a substantially white frequency spectrum.

In the context of input/output (IO) performance, the most important power supply noise cases are package resonance and first droop. Package resonance is created by the LC tank circuit formed by the on die decap and package inductance. It generally occurs in the 100-200 MHz frequency range. Somewhat related to package resonance is first droop, which is due to the sharp current steps that are created when the IO starts or stops transmitting data. In either case, the supply noise is highly dependent on the data pattern. In the case of package resonance, the worst case occurs when the data pattern contains a significant amount of energy at the resonance frequency. In the case of first droop, the worst case occurs when all IO buffers drive in the same direction (e.g., transmit 0). Using normal data traffic, it is fairly easily to hit either one of these cases. As is further described below, embodiments of the invention suppress supply noise by scrambling data that is transmitted on the memory interconnect.

Figure 1:
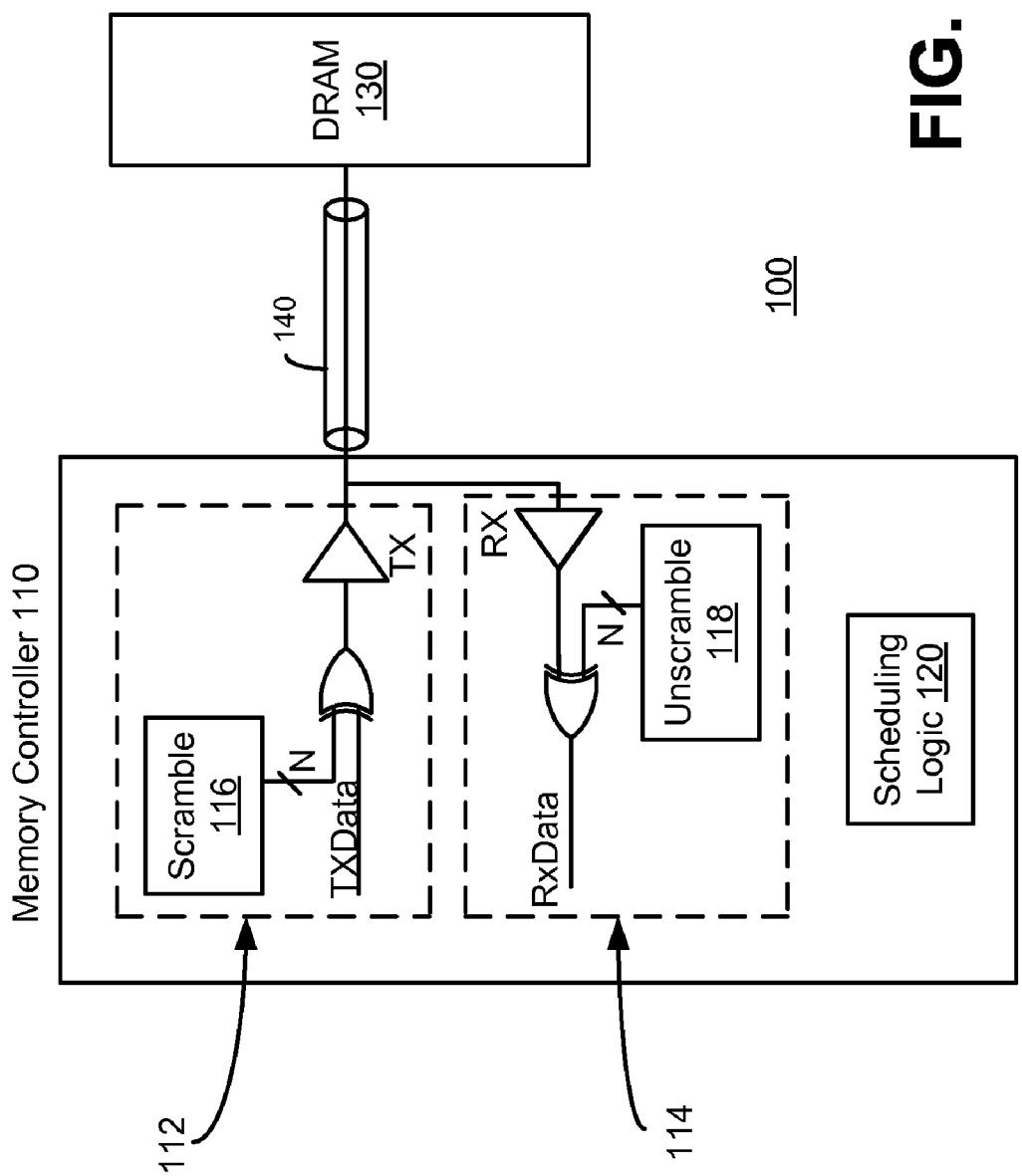
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. System 100 includes memory controller 110 and dynamic random access memory (DRAM) 130 coupled together via memory interconnect 140. In some embodiments, system 100 implements, at least in part, the DDR specification. In alternative embodiments, system 100 may include more elements, fewer elements, and/or different elements.

Memory controller 110 controls the flow of information into and out of DRAM 130. In some embodiments, memory controller 110 is integrated onto the same integrated circuit as one or more processing cores. In alternative embodiments, memory controller 110 may be part of a separate integrated circuit such as a memory controller hub.

Memory controller 110 includes transmit (TX) data path 112 and receive (RX) data path 114. The TX and RX data paths enable memory controller 110 to reduce power supply noise by scrambling transmitted data in a manner that is transparent to DRAM 130. In some embodiments, scrambling logic 116 generates, in parallel, a plurality of pseudo random outputs that are uncorrelated with one another. The WR data is XOR'd with the outputs of scrambling logic 116 so that the data transmitted to DRAM 130 has a substantially pseudo random pattern. Conversely, unscramble logic 118 generates a plurality of pseudo random outputs to unscramble the read (RD) data received from DRAM 130. In some embodiments, the power supply noise exhibited in data transmitted over interconnect 140 is substantially reduced because the transmitted data has a substantially white frequency spectrum. As shown in FIG. 1, embodiments of the invention may suppress supply noise on both the memory controller side and the DRAM side because the data transmitted over the memory interconnect is always scrambled. The TX and RX data paths are further discussed below with reference to FIGS. 2-5.

Figure 2:
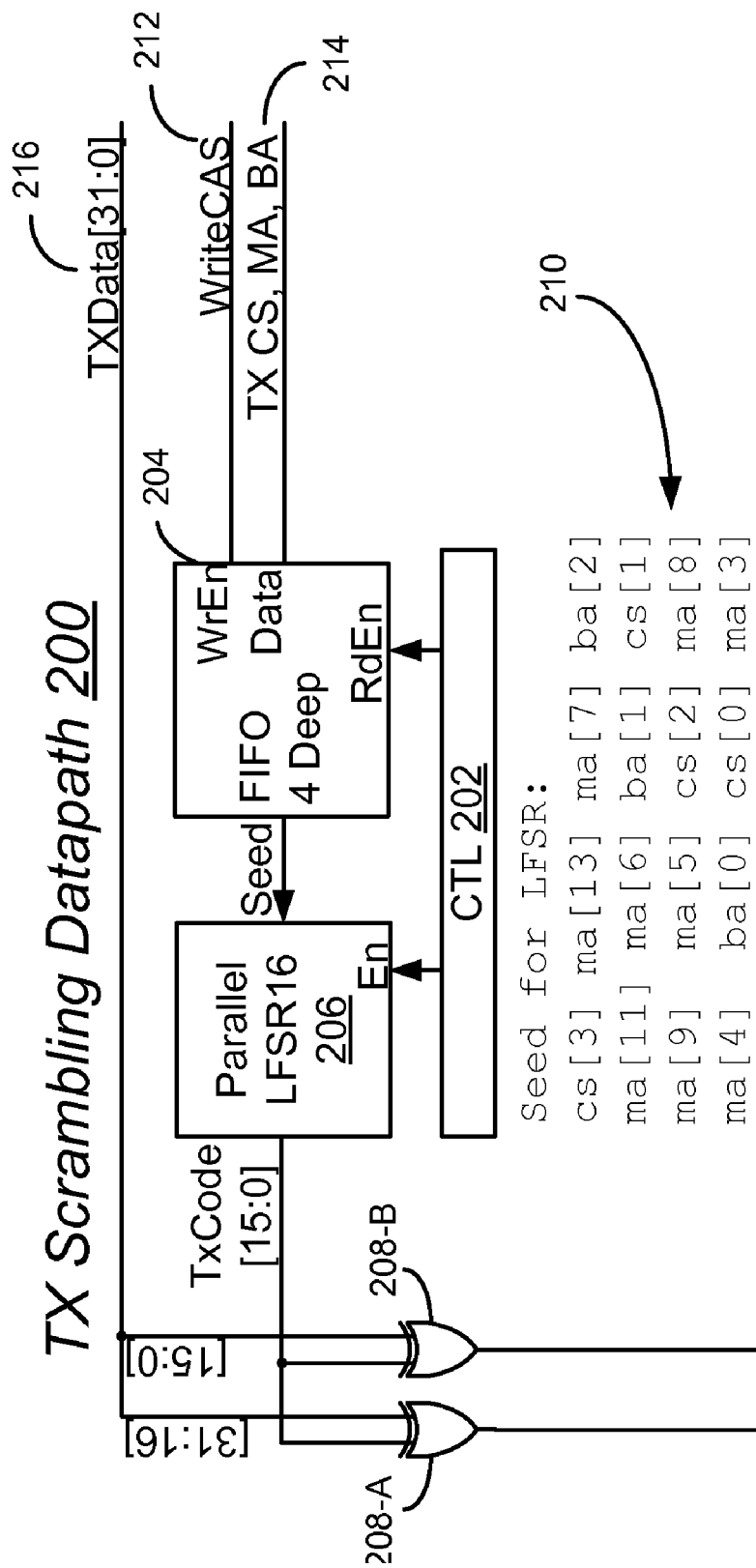
FIG. 2 is a block diagram illustrating selected aspects of a transmit data path according to an embodiment of the invention.

FIG. 2 is a block diagram illustrating selected aspects of a TX data path according to an embodiment of the invention. TX data path 200 includes control logic 202, FIFO (first in, first out) buffer 204, parallel linear feedback shift register (LFSR) 206, and XOR logic 208. In alternative embodiments, TX data path 200 may include more elements, fewer elements, and/or different elements.

LFSR 206 creates a pseudo random pattern that is used to scramble WR data before it is sent to memory. Unlike other LFSR's which provide single bit outputs, LFSR 206 provides a parallel output of multiple bits. In the illustrated embodiment, LFSR 206 provides an output of 16 bits per cycle. In alternative embodiments, LFSR 206 may output (in parallel) a different number of bits (e.g., 8, 32, 64, etc.) per cycle. The number of cycles may depend on the number of transmissions per burst. The LFSR may also shift based on the number of transmissions per burst. For example, if a burst includes transmitting 16 "chunks" of data, then LFSR 206 may execute a shift to generate a new code for each "chunk" of data in the burst. The outputs of LFSR 206 are uncorrelated with one another. Each output is XOR'd with one or more bits of the transmit bit lanes (e.g., using XOR logic 208) to "scramble" the data prior to transmitting it. Thus, the data transmitted to memory has a pseudo random pattern since the WR data is XOR'd with the pseudo random outputs of LFSR 206.

In some embodiments, LFSR 206 is initialized (or "seeded") with at least a portion of the address associated with the WR data. This simplifies the process of unscrambling the data since the same address can be used to seed an LFSR in the RX direction during a RD operation (see, e.g., FIG. 3). In the illustrated embodiment, the seed is based on the column address including, for example, the following bits: MA[13, 11, 9:4], BA[2:0], CS[7:0]. "MA" refers to memory address and is used to select a column from a row of memory. "BA" refers to the bank address and "CS" selects the rank. In alternative embodiments, the seed may be based on a different portion of the address. In yet other alternative embodiments, the seed may be based on something other than the address of the data. Reference number 210 illustrates a seed for LFSR 206 according to an embodiment of the invention.

FIFO 204 provides a buffer for multiple write column address strobes (CASs) 212. In some embodiments, each time a write CAS is issued, a portion of the write CAS is saved in FIFO 204 to provide the seed to LFSR 206 (e.g., as shown by 214). When the write data is available (e.g., on bit lanes 216), the seed is pushed to LFSR 206. The WR data and the outputs of LFSR 206 are XOR'd (e.g., using XOR logic 208) to create scrambled data (e.g., data that has a substantially pseudo random pattern). A TX (e.g., TX 112, shown in FIG. 1) transmits the scrambled data to memory via an interconnect (e.g., interconnect 140, shown in FIG. 1).

Control logic 202 controls TX data path 200. For example, control logic 202 instructs FIFO 204 to load the seed at the appropriate times. In addition, control logic 202 may determine when LFRS 206 generates the pseudo random outputs. As illustrated in FIG. 2, in some embodiments, the TX data is split into two 16-bit portions and the same LFSR codes (or outputs) are used for each portion. That is, a 16 bit LFSR output may be used to scramble 32 bits of data. In alternative embodiments, the outputs of the LFSR may be reused (or not) differently.

Figure 3:
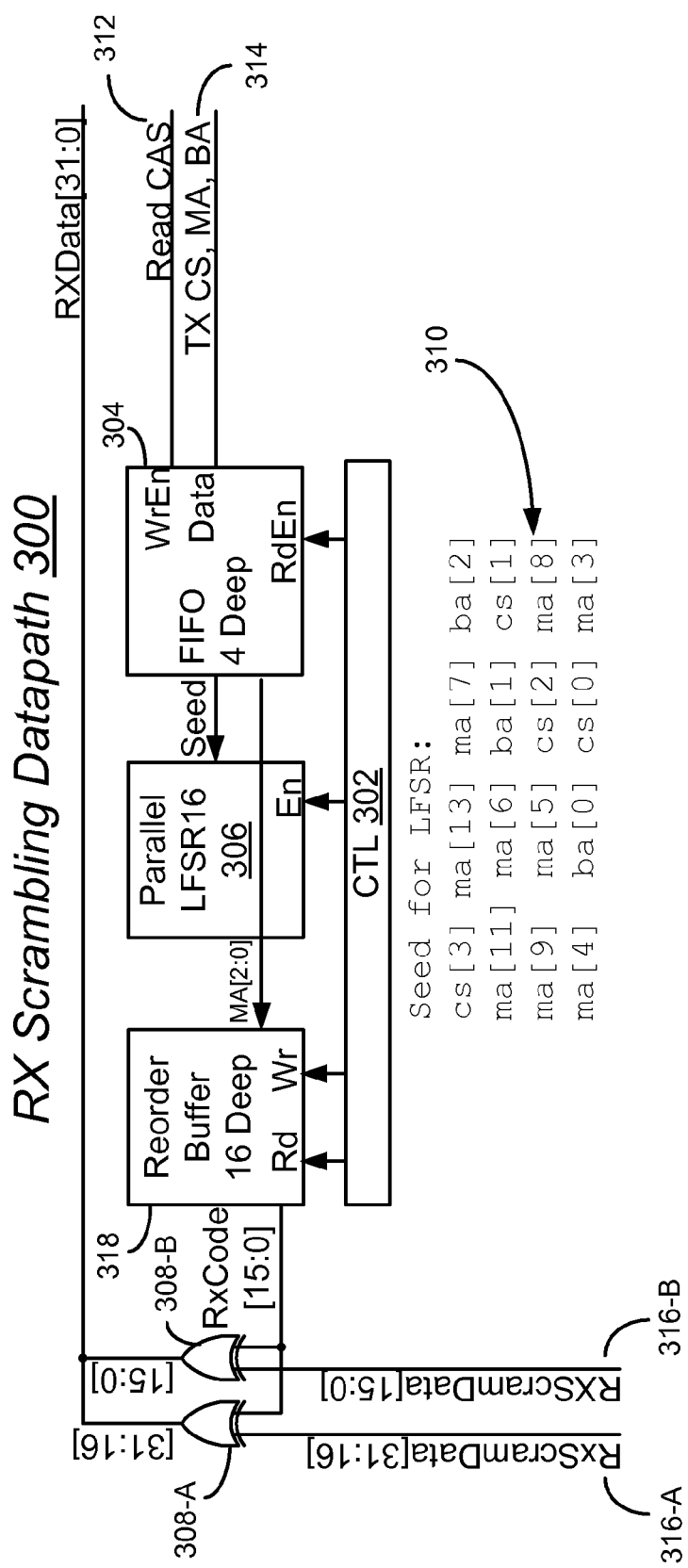
FIG. 3 is a block diagram illustrating selected aspects of a receive data path according to an embodiment of the invention.

FIG. 3 is a block diagram illustrating selected aspects of a receive data path according to an embodiment of the invention. RX data path 300 includes control logic 302, FIFO buffer 304, parallel LFSR 306, reorder buffer 318, and XOR logic 308. In alternative embodiments, RX data path 300 may include more elements, fewer elements, and/or different elements.

LFSR 306 creates a pseudo random pattern that is used to unscramble RD data that is received from memory. LFSR 306 provides a parallel output of multiple uncorrelated bits. In the illustrated embodiment, LFSR 306 provides an output of 16 bits per cycle. In alternative embodiments, LFSR 306 may output (in parallel) a different number of bits (e.g., 8, 32, 64, etc.) per cycle. The outputs of LFSR 306 are uncorrelated with one another. Each output is XOR'd with one or more bits of the RX lanes (e.g., using XOR logic 308) to "unscramble" the data received from memory.

In some embodiments, LFSR 306 is seeded with at least a portion of the address associated with the RD data. In the illustrated embodiment, the seed is based on the column address including, for example, the following bits: MA[13, 11, 9:4], BA[2:0], CS[7:0]. In alternative embodiments, the seed may be based on a different portion of the address. In yet other alternative embodiments, the seed may be based on something other than the address of the data. Reference number 310 illustrates a seed for LFSR 306 according to an embodiment of the invention.

FIFO 304 provides a buffer for multiple RD column address strobes (CASs) 312. In some embodiments, each time a RD CAS is issued, a portion of the RD CAS is saved in FIFO 304 to provide the seed to LFSR 306 (e.g., as shown by 314). When the RD data is available (e.g., on bit lanes 316), the seed is pushed to LFSR 306. The RD data and the outputs of LFSR 306 are XOR'd (e.g., using XOR logic 308) to create scrambled data (e.g., data that has a substantially pseudo random pattern).

The DDR Specification supports out of order data reads. Thus, data that is read back from memory may not be received in the same order that it is transmitted to memory. In some embodiments, RX data path 300 includes reorder buffer 318 to reorder the pseudo random codes that are generated from the LFSR to match the order in which data is actually received. The RD CAS may include information that indicates the order in which data is going to be read. For example, bits MA [2:0] may indicate the order of the RD data. In some embodiment, the unscramble codes are pre-calculated and stored in reorder buffer 318. Reorder buffer 318 may alter the order of the codes so that they match the order of the RD data. The RD data may then be properly unscrambled by the reordered codes. In alternative embodiments, a different mechanism may be used to match the codes with RD data that is received in a different order than it was transmitted.

Control logic 302 controls RX data path 300. For example, control logic 302 instructs FIFO 304 to load the seed at the appropriate times. In addition, control logic 302 may determine when LFRS 306 generates the pseudo random outputs. Control logic 302 may also control the operation of reorder buffer 318.

FIG. 4 is a conceptual diagram illustrating selected aspects of a scrambling (or unscrambling) process based on a parallel linear feedback shift register (LFSR) implemented according to an embodiment of the invention. Each row of table 400 illustrates the logic for calculating the output of an LFSR (e.g., LFSR 206 shown in FIG. 2 and LFSR 306 shown in FIG. 3). In some embodiments, the LFSR implements the polynomial: $X^{16}+X^{13}+X^{10}+X^9+X^8+X^4+1$. For example, referring to row 2, the output N+1 of bit 2 is determined by the following expression: $Out_{N+1}[2]=Out_N[2]+Out_N[5]+Out_N[8]+Out_N[9]+Out_N[A]+Out_N[E]$. In alternative embodiments, the LFSR may implement different polynomials and/or different logic.

The effectiveness of scrambling was analyzed using MATLAB for 1333 MTs (mega transfers per second) DDR with extracted power delivery models. Table 1 (shown below) summarizes the results for both first droop and package resonance. For continuous data streams, scrambling largely eliminated supply noise. These results, however, degraded substantially when gaps were added to the data transmission. The worst case occurred when the gaps corresponded to the resonance frequency of the power delivery network. Smaller or larger gaps produced less noise since they were further away from the resonance frequency. Even with these gaps, however, scrambling still reduced the worst case supply noise by an impressive 45%.

TABLE 1

|  | 1st Droop Peak 2 Peak | | Resonance Pattern Peak 2 Peak | |
| --- | --- | --- | --- | --- |
|  | Clear | Scrambled | Clear | Scrambled |
| 6.0 nS Data/0 nS Gap | 479 mV | 107 mV | 485 mV | 66 mV |
| 6.0 nS Data/1.5 nS Gap | 509 mV | 222 mV | 486 mV | 231 mV |
| 6.0 nS Data/3.0 nS Gap | 357 mV | 245 mV | 348 mV | 271 mV |
| 6.0 nS Data/4.5 nS Gap | 205 mV | 150 mV | 137 mV | 152 mV |
| Worst Case | 509 mV | 245 mV | 486 mV | 271 mV |
| Noise Reduction | Baseline | 52 | Baseline | 45 |

Figure 5:
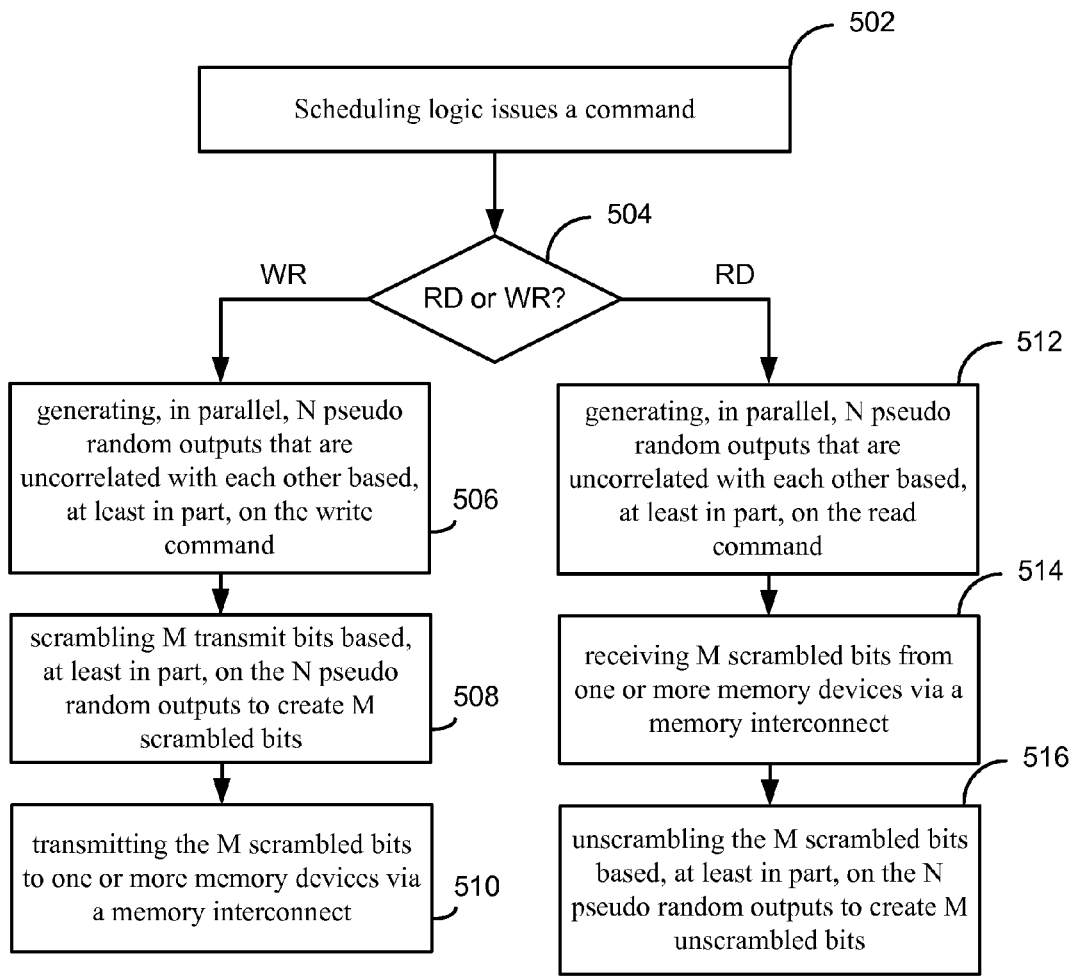
FIG. 5 is a flow diagram illustrating selected aspects of a method for suppressing power supply noise using data scrambling according to an embodiment of the invention.

FIG. 5 is a flow diagram illustrating selected aspects of a method for suppressing power supply noise using data scrambling according to an embodiment of the invention. Referring to process block 502, scheduling logic (e.g., scheduling logic 120, shown in FIG. 1) issues a command. The command may be any of a number of different types of commands including, for example, a RD command or a WR command as shown by 502.

If the command is a WR command, then scrambling logic in the WR data path generates, in parallel, N pseudo random outputs that are uncorrelated with each other at 506. In some embodiments, the N pseudo random outputs are based, at least in part, on the WR command. For example, the scrambling logic may include a parallel LFSR and a portion of the WR CAS command may be used to seed the LFSR.

Referring to process block 508, M TX bits are scrambled by N pseudo random outputs. In some embodiments, M is 32 and N is 16. In alternative embodiments, M and/or N may have different values. In some embodiments, the M TX bits are "scrambled" by XOR'ing them with the N pseudo random outputs. The LFSR may shift once per burst of data and a different N (e.g., 16) bit code may be used for each chunk of data in a burst.

Referring to process block 510, the M scrambled bits are transmitted to one or more memory devices via a memory interconnect. In some embodiments, the M scrambled bits have a white frequency spectrum. That is, the energy at any frequency is substantially the same. On average, half of the received scrambled bits are logical highs and half of the received scrambled bits are logical lows. The scramble and transmit process may be repeated until all of the entire burst of data is sent.

If the issued command is a RD command, then scrambling logic in the RD data path generates, in parallel, N pseudo random outputs that are uncorrelated with each other at 512. In some embodiments, the N pseudo random outputs are based, at least in part, on the RD command. For example, the scrambling logic may include a parallel LFSR and a portion of the RD CAS command may be used to seed the LFSR.

Referring to process block 514, the M scrambled bits are received from one or more memory devices via the memory interconnect. The received scrambled bits, like the transmitted scrambled bits have a white frequency spectrum. On average, half of the received scrambled bits are logical highs and half of the received scrambled bits are logical lows.

Referring to process block 516, M RD bits are unscrambled by the N pseudo random outputs. In some embodiments, M is 32 and N is 16. In alternative embodiments, M and/or N may have different values. In some embodiments, the M RD bits are "unscrambled" by XOR'ing them with the N pseudo random outputs. The LFSR may shift once per burst of data and a different N (e.g., 16) bit code may be used for each chunk of data in a burst.

Embodiments of the invention do not affect the performance of error correction codes (ECCs). In fact, embodiments of the invention may actually enhance ECC coverage by protecting against transmission errors on the command interconnect. For example, if a RD address is corrupted by a transmission error on the command interconnect, then the wrong data will be returned to the memory controller. The data will be unscrambled using the "wrong" seed (e.g., based on the correct RD address) and this will flag an ECC error.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
   a transmit data path to transmit data transmissions to one or more memory devices coupled to the memory controller, the transmit data path including, scrambling logic to generate, in parallel, N pseudo random outputs that are uncorrelated with each other for each data transmission, XOR logic having as a first input the N pseudo random outputs of the scrambling logic and having as a second input M data bits, the XOR logic to output, in parallel, M scrambled bits for each data transmission, and a transmitter coupled with the XOR logic, the transmitter to transmit, for each data transmission, the M scrambled bits to the one or more memory devices via a memory interconnect, wherein the M scrambled bits have a pseudo random pattern, the one or more memory devices to store the M scrambled bits; and a receive data path to receive data transmissions from the one or more memory devices, the receive data path including, unscrambling logic to generate, in a first order for each data transmission to be received, N pseudo random outputs that are uncorrelated with each other in parallel, a receiver to receive, in parallel, transmissions of M scrambled bits from the memory interconnect in a second order, a reorder buffer to match the first order of the outputs of the unscrambling logic to the second order of the data received, and a second XOR logic having as a first input the M scrambled bits from the memory interconnect and having as a second input the N pseudo random outputs of the unscrambling logic from the reorder buffer, the second XOR logic to output, in parallel, M unscrambled bits.

2. The integrated circuit of claim 1, wherein the scrambling logic comprises a parallel linear feedback shift register (LFSR).

3. The integrated circuit of claim 2, wherein a seed for the parallel LFSR is based, at least in part, on a memory address associated with the respective data transmission.

4. The integrated circuit of claim 3, wherein the seed for the parallel LFSR is based, at least in part, on a column address associated with the respective data transmission.

5. The integrated circuit of claim 4, wherein the seed for the parallel LFSR is scrambled prior to use.

6. The integrated circuit of claim 4, wherein the parallel LFSR is to be seeded at the beginning of each data transmission.

7. The integrated circuit of claim 4, wherein the parallel LFSR is to be seeded at the beginning of each received data transmission.

8. The integrated circuit of claim 2, wherein the parallel LFSR is based, at least in part, on the polynomial: $X^{16}+X^{13}+X^{10}+X^9+X^8+X^4+1$.

9. The integrated circuit of claim 1, wherein the unscrambling logic comprises a parallel linear feedback shift register (LFSR).

10. The integrated circuit of claim 9, wherein a seed for the parallel LFSR is based, at least in part, on a column address associated with the respective data transmission.

11. A method comprising:
issuing write commands to instruct a transmit data path to write bursts of data to memory;
generating, in parallel, N pseudo random outputs that are uncorrelated with each other for each write burst based, at least in part, on the write command;
scrambling M transmit bits based, at least in part, on the N pseudo random outputs to create M scrambled bits for each write burst;
transmitting, for each write burst, the M scrambled bits to one or more memory devices via a memory interconnect, the one or more memory devices to store the M scrambled bits;
issuing read commands to instruct a receive data path to read bursts of data from memory;
generating in a first order for each read burst, N pseudo-random outputs that are uncorrelated with each other in parallel;
receiving bursts of data via a memory interconnect in a second order, each read burst comprising M scrambled bits from one or more memory devices;
re-ordering the N pseudo-random outputs in the first order to match the received scrambled bits in the second order; and
unscrambling, for each burst, the M scrambled bits based, at least in part, on the reordered N pseudo random outputs to create M unscrambled bits.

12. The method of claim 11, wherein generating, in parallel, N pseudo random outputs that are uncorrelated with each other based, at least in part, on the write command comprises:
generating, in parallel, N pseudo random outputs that are uncorrelated with each other based, at least in part, on a memory address associated the burst of data.

13. The method of claim 12, wherein generating, in parallel, N pseudo random outputs that are uncorrelated with each other based, at least in part, on a memory address associated the burst of data comprises:
generating, in parallel, N pseudo random outputs that are uncorrelated with each other based, at least in part, on a column address associated the burst of data.

14. A system comprising:
one or more dynamic random access memory devices (DRAMs); and
a memory controller included in an integrated circuit coupled with the one or more DRAMs via a memory interconnect, the integrated circuit having
a transmit data path to transmit data transmissions to one or more memory devices coupled to the memory controller, the transmit data path including,
scrambling logic to generate, in parallel, N pseudo random outputs that are uncorrelated with each other for each data transmission,
XOR logic having as a first input the N pseudo random outputs of the scrambling logic and having as a second input M data bits, the XOR logic to output, in parallel, M scrambled bits for each data transmission, and
a transmitter coupled with the XOR logic, the transmitter to transmit, for each data transmission, the M scrambled bits to the one or more memory devices via a memory interconnect, wherein the M scrambled bits have a pseudo random pattern, the one or more memory devices to store the M scrambled bits; and
a receive data path to receive data transmissions from the one or more memory devices, the receive data path including,
unscrambling logic to generate, in a first order for each data transmission to be received, N pseudo random outputs that are uncorrelated with each other in parallel,
a receiver to receive, in parallel, transmissions of M scrambled bits from the memory interconnect in a second order,
a reorder buffer to match the first order of the output of the unscrambling logic to the second order of the data received, and a second XOR logic having as a first input the M scrambled bits from the memory interconnect and having as a second input the N pseudo random outputs of the unscrambling logic from the reorder buffer, the second XOR logic to output, in parallel, M unscrambled bits.

15. The system of claim 14, wherein the scrambling logic comprises a parallel linear feedback shift register (LFSR).

16. The system of claim 15, wherein a seed for the parallel LFSR is based, at least in part, on a memory address associated with the respective data transmission.

17. The system of claim 16, wherein the seed for the parallel LFSR is scrambled prior to use.

18. The system of claim 15, wherein the parallel LFSR is based, at least in part, on the polynomial: $X^{16}+X^{13}+X^{10}+X^9+X^8+X^4+1$.

19. The system of claim 14, wherein the unscrambling logic comprises a parallel linear feedback shift register (LFSR).

20. The system of claim 19, wherein a seed for the parallel LFSR is based, at least in part, on a column address associated with the respective data transmission.

21. The system of claim 20, wherein the parallel LFSR is to be seeded at the beginning of each received data transmission.

* * * * *